United States Patent [19]

Takahashi et al.

[11] Patent Number: 5,218,279
[45] Date of Patent: Jun. 8, 1993

[54] METHOD AND APPARATUS FOR DETECTION OF PHYSICAL QUANTITIES, SERVOMOTOR SYSTEM UTILIZING THE METHOD AND APPARATUS AND POWER STEERING APPARATUS USING THE SERVOMOTOR SYSTEM

[75] Inventors: Tadashi Takahashi; Syooichi Kawamata; Shigeki Morinaga, all of Hitachi, Japan

[73] Assignee: Hitachi, Ltd., Tokyo, Japan

[21] Appl. No.: 637,776

[22] Filed: Jan. 7, 1991

[30] Foreign Application Priority Data

Jan. 8, 1990 [JP] Japan .................................. 2-000508

[51] Int. Cl.$^5$ ............................................. G01D 5/00
[52] U.S. Cl. ........................... 318/560; 318/439; 318/432; 324/174; 324/117 H; 338/32 H; 307/309; 307/491
[58] Field of Search ....................... 318/430–434, 318/266–293; 180/142, 143, 141, 79.1; 324/207.14, 207.22, 207.25, 225, 207.2, 117 H; 338/32 H, 32 R; 73/862.33

[56] References Cited

U.S. PATENT DOCUMENTS

| | | | |
|---|---|---|---|
| 3,613,021 | 10/1971 | Scheidt | 330/6 |
| 3,684,997 | 8/1972 | Masuda | 338/32 H |
| 3,825,777 | 7/1974 | Braun | 338/32 H X |
| 3,835,373 | 9/1974 | Matula | 338/32 H X |
| 4,255,708 | 3/1981 | Wilson, III | 338/32 R X |
| 4,343,026 | 8/1982 | Griffith et al. | 360/113 |
| 4,418,372 | 11/1983 | Hayashida et al. | 338/32 R |
| 4,435,653 | 3/1984 | Matui et al. | 324/117 H X |
| 4,449,081 | 5/1984 | Doeman | 324/117 H X |
| 4,455,514 | 6/1984 | Ohno | 318/439 X |
| 4,464,629 | 8/1984 | Tanaka et al. | 330/6 |
| 4,584,552 | 4/1986 | Suzuki et al. | 338/32 H |
| 4,628,259 | 12/1986 | Takahashi et al. | 338/32 R |
| 4,645,950 | 2/1987 | Carvajal | 330/6 X |
| 4,646,014 | 2/1987 | Eulenberg | 338/32 H X |
| 4,829,248 | 5/1989 | Loubier | 338/32 H |
| 4,833,406 | 5/1989 | Foster | 338/32 H |
| 4,857,842 | 8/1989 | Sturman et al. | 338/32 H |
| 4,939,435 | 7/1990 | Takahashi et al. | 318/432 |
| 4,939,448 | 7/1990 | Gudel | 324/117 H |
| 4,939,449 | 7/1990 | Cattaneo et al. | 324/117 H X |
| 4,947,108 | 8/1990 | Gudel | 324/117 H |
| 4,966,041 | 10/1990 | Miyazaki | 338/32 H X |
| 4,992,731 | 2/1991 | Lorenzen | 324/174 |

*Primary Examiner*—Paul Ip
*Attorney, Agent, or Firm*—Antonelli, Terry, Stout & Kraus

[57] ABSTRACT

In an apparatus of detecting an environmental physical quantity such as magnetism and temperature by utilizing a sensitive element having an internal, electrical physical quantity which changes as the environmental physical quantity changes, an external operator element is provided which acts, when the environmental physical quantity acting on the sensitive element changes, a physical quantity corresponding to the change on the sensitive element, an electrical quantity supplied to generate in the external operator a physical quantity corresponding to the change is detected, and the environmental physical quantity is detected from the electrical quantity to provide a detection signal devoid of hysteresis and "depression".

17 Claims, 12 Drawing Sheets

METHOD AND APPARATUS FOR DETECTION OF PHYSICAL QUANTITIES, SERVOMOTOR SYSTEM UTILIZING THE METHOD AND APPARATUS AND POWER STEERING APPARATUS USING THE SERVOMOTOR SYSTEM

BACKGROUND OF THE INVENTION

The present invention relates to a method and an apparatus of detecting physical quantities representative of magnetism and temperature as well as light and pressure and in particular to a motor system and other apparatus utilizing the above method and apparatus.

Detection of magnetism and temperature by means of a sensitive element such as a magnetoresistive element or a thermistor has hitherto been practiced widely.

Generally, the sensitive element has such a property that its internal resistance changes in accordance with the presence or absence or the magnitude of a physical quantity and therefore by determining the magnitude of the resistance, the physical quantity can be detected.

On the other hand, the sensitive element has generally a hysteresis by which the sensitive element presents different resistance values with application of the same physical quantity thereto depending on whether the physical quantity has changed increasingly or decreasingly before application of the same physical quantity. It is well known in the art that the detection value includes an error due to the hysteresis.

In addition, the sensing characteristic of the sensitive element has a "depression" called Barkhausen noise and a "depression" eventually takes place in an output signal based on the sensing characteristic (see FIG. 21).

The hysteresis and depression are of a phenomenon which generally develops in the sensitive element and is remarkable, especially, in magnetosensitive elements.

An invention of magnetoresistive element described in Japanese patent unexamined publication JP-A-58-56485 and an invention of yoke type thin film magnetic head described in Japanese patent unexamined publication JP-A-63-96713 are directed to elimination of the hysteresis and Barkhausen noise.

More particularly, the former patent publication describes that hysteresis and Barkhausen noise are eliminated by applying a bias magnetic field Hc to a magnetoresistive element and the later patent publication describes that a location where a Barkhausen noise is generated is shifted to outside the detection range by applying a bias field to a magnetoresistive element.

Conventionally, however, in detecting physical quantities, by means of the sensitive element as in the case of the above patent publications, technique has been employed which detects the resistance of the sensitive element per se to provide an electrical signal.

In the aforementioned prior arts, the bias field is applied to the magnetoresistive element to decrease the hysteresis and Barkhausen noise or to shift the location of generation of Barkhausen noise but as far as the magnetic field to be detected changes, it is difficult to completely eliminate the hysteresis and Barkhausen noise.

The use of magnetoresistive element, therefore, involves problems such that the magnetic field can not be detected accurately and when this magnetoresistive element is used as a sensor for detection of position and speed, detection of incorrect position and speed may result to impair control capability. Further, when an analog value of the output signal from the magnetoresistive element is used as a position signal, there arises a problem that if the analog signal is interfered with a noise, a considerable position error occurs.

In addition, when a constant bias field is applied to an MR (magnetoresistive) element to improve linearity, the linearity is improved effectively for the magnetic field to be detected being small. But for the magnetic field of interest being large, the linearity is hardly improved so that the magnitude of detectable field is limited.

These problems are due to the fact that the resistance of the sensitive element per se is measured to provide a detection signal. In other words, by the recent scientific technology, it is still difficult to manufacture sensitive elements without hysteresis.

SUMMARY OF THE INVENTION

A principal object of the invention is to provide an apparatus of detecting physical quantities without detecting the resistance of the sensitive element but by detecting a physical, such as electrical, quantity applied to a compensation element effective to keep the resistance of the sensitive element constant, thereby avoiding effects of hysteresis and depression.

Another object of the invention is to provide a specific magnetic detection apparatus utilizing the above principle and a servomotor system and a power steering apparatus which are provided with the magnetic detection apparatus.

According to the invention, in detecting an environmental physical quantity such as magnetism and temperature by utilizing a sensitive element having an internal, electrical physical quantity which changes as the environmental physical quantity changes, an external active element is provided, as the compensation element, for acting when the environmental physical quantity acting on the sensitive element changes, a physical quantity corresponding to the change on the sensitive element, an electrical quantity is supplied to the external active element to generate therein the physical quantity corresponding to the change, and the environmental physical quantity is detected from detection of the electrical quantity.

With the above construction, the following operation can be effected to attain the aforementioned object.

Namely, the compensation element is effective to keep the resistance of the magnetosensitive element constant thereby to prevent the latter element from assuming hysteresis. For example, the compensation element is formed of a conductor, not semiconductor, free from generation of hysteresis and "depression" and consequently a correct detection signal can be obtained.

The detection signal can be obtained as a sinusoidal signal devoid of distortion and therefore, when the detection is carried out in analog fashion, a fine position can be determined in position detection and in torque detection, torque can be detected as a phase difference between sinusoidal signals and hence it is possible to detect the torque with high accuracy within one cycle of the sinusoidal signal.

Further, in the torque detection utilizing the MR elements, torque can be detected even during stopping and besides in contactless fashion, thereby ensuring correct detection in the presence of large vibrations with high reliability.

DESCRIPTION OF THE PREFERRED EMBODIMENTS g

An embodiment of the construction of the present invention will now be described with reference to FIGS. 1 and 2.

Figure 1:
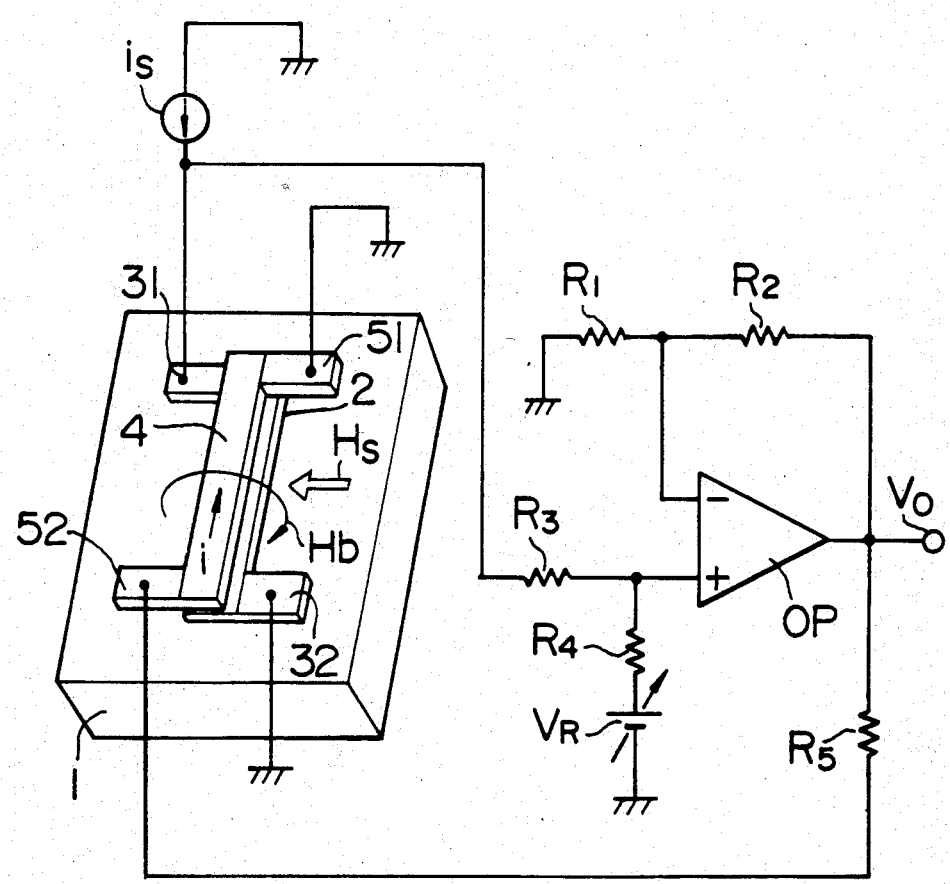
FIG. 1 is a circuit diagram showing an embodiment of the invention and useful to explain the principle thereof.

FIG. 1 diagrammatically shows the fundamental concept of the invention as applied to a magnetic detection apparatus, and FIG. 2 shows signal waveforms.

Referring to FIG. 1, reference numeral 1 designates an insulating substrate made of glass or ceramic and carrying on its surface a sensitive element, in this example, a magnetoresistive element 2 serving as a magnetosensitive portion which is formed through mask vapor deposition or etching process. Respectively connected to the opposite ends of the electroresistive element (hereinafter referred to as an MR element) 2 are terminals 31 and 32 which are made of the same material as the MR element 2 so as to be integral therewith or made of a different material such as copper or aluminum. One terminal 31 is connected to a constant current unit $i_s$ and the other terminal 32 is grounded.

An active element or operator 4 made of copper or aluminum is provided above the MR element 2 with electrical insulation therebetween. In this example, the operator is a highly conductive electrical conductor. Connected to the opposite ends of the conductor 4 are terminals 51 and 52. The terminal 51 is grounded and the terminal 52 is connected to the output terminal of an amplifier OP through a resistor R5. The aforementioned terminal 31 is also connected to the positive input terminal of the amplifier OP through a resistor R3. Resistors R1 and R2 are connected in series, with one end of the resistor R1 grounded, a junction between the resistors R1 and R2 connected to the negative input terminal of the amplifier OP and one end of the resistor R2 connected to the output terminal of the amplifier OP. Also connected to the positive input terminal of the amplifier OP is a series circuit of a resistor R4 and variable DC power supply $V_R$ which is grounded at the other end. Denoted by $V_O$ is an output signal of the amplifier OP, which output signal $V_O$ behaves as a magnetic detection signal to be described later.

The operation of the apparatus of the invention constructed as above will now be described.

Figure 5:
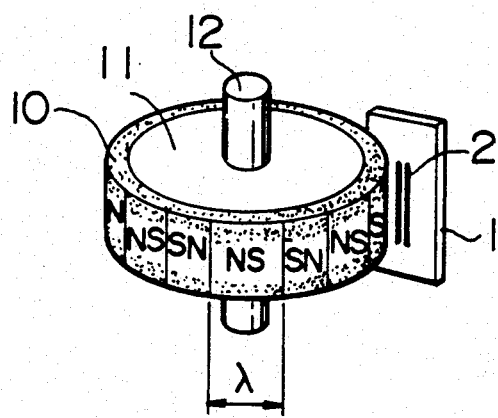
FIG. 5 is a perspective view of a magnetic encoder.

In FIG. 1, Hs represents a magnetic field to be detected which acts on the MR element 2. The magnetic field to be detected is generated from magnetic poles N, S, N, . . . recorded as magnetic signals on a magnetic recording medium 10 as shown in FIG. 5. The MR element 2 is disposed in the vicinity of the magnetic recording medium 10 so as to be sensitive to this magnetic field. With reference to FIG. 5, λ designates a magnetization pitch between magnetic poles N and S, 11 a rotor carrying the magnetic recording medium 10, and 12 a rotary shaft. The magnetic recording medium 10 is made of synthetic resin admixed with magnetic powder by about 60 to 70 weight % and the rotor 11 is made of a non-magnetic material such as aluminum, ceramic or synthetic resin.

Under this condition, consider first the case where the magnetic field Hs to be detected is absent with voltage of the variable voltage supply $V_R$ being zero.

As well known in the art, the MR element 2 senses the magnetic field in such a way that its resistance is decreased. Such a characteristic is graphically shown in FIG. 2A. The MR element 2 made of an NiFe alloy called permalloy has a magnetoresistive characteristic as represented by Rx in FIG. 2A. More specifically, the MR element 2 assumes a maximum resistance Ro when unaffected by the magnetic field, and its resistance decreases gradually as the effect of the magnetic field increases and stops changing when saturated with the magnetic field being in excess of a predetermined value of intensity. This characteristic is the same for polarities N and S of the magnetic field. Accordingly, it is possible to detect the presence or absence of the magnetic field and the magnitude thereof on the basis of the resistance value of the MR element 2.

Since the voltage of the variable power supply $V_R$ is zero in the absence of the magnetic field Hs to be detected, a voltage determined by a constant current Is and the maximum value Ro of resistance of the MR element 2 is applied to the positive input terminal of the amplifier OP. This voltage is amplified by the amplifier OP to produce a voltage Vo at the output terminal of the amplifier OP. As the voltage Vo develops at the amplifier output, a current i complying with the magnitude of the voltage is caused to flow into the conductor 4 serving as the operator through the resistor R5. With the current i passed through the conductor 4, a magnetic field Hb complying with the magnitude of the current i is generated in the magnetosensitive direction of the MR element 2. This magnetic field Hb serves as a compensation field or bias field acting on the magnetic field Hs to be detected. When applied with the bias field Hb, the MR element 2 decreases its resistance with the result that the voltage at the positive input terminal of the amplifier OP is decreased to lower the output voltage Vo thereof.

With the output voltage Vo lowered, the current flowing through the conductor 4 is decreased to decrease the bias field Hb. The above operation is repeated instantaneously and as a result, the current flowing through the conductor 4 converges to an amplitude value by which a bias field Hbo is generated.

At the bias field Hbo, the operating point is P1 at which the MR element 2 assumes a constant resistance of Rb.

Figure 2A:
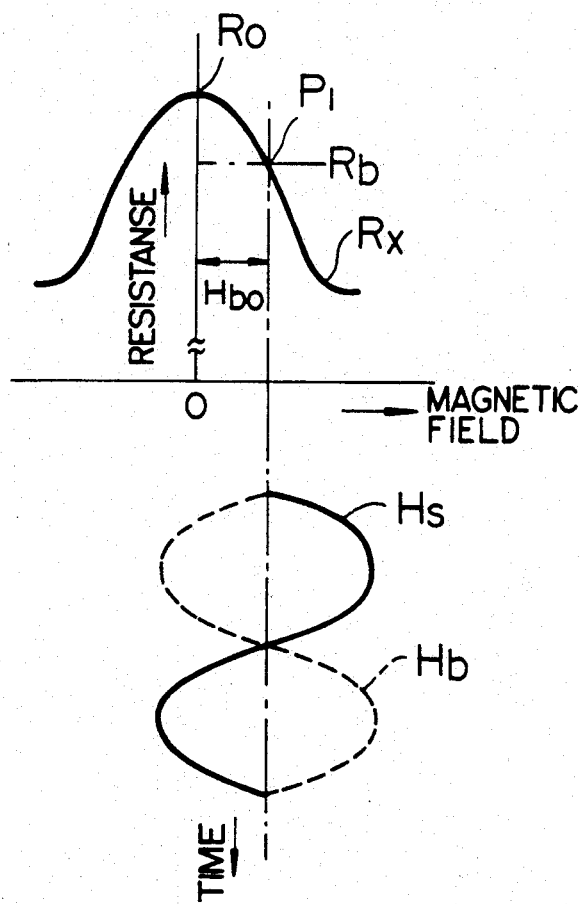
FIGS 2A and 2B are waveform diagrams useful to explain a detection signal.

Under this condition, when the signal field (magnetic field to be detected) Hs as shown in FIGS. 1 and 2A is applied to the MR element 2, the resistance of the MR element 2 is inclined to decrease from Rb, followed by a decrease in the voltage at the positive input terminal of the amplifier OP and a consequent decrease in the amplifier output voltage Vo This decreases the current flowing through the conductor 4, causing the bias field Hb to be decreased. Thus, in the resultant magnetic field acting on the MR element 2, the bias field Hb decreases by an amount by which the signal field Hs increases to make constant the total magnetic field intensity (Hs+Hb) acting on the MR element 2, thereby ensuring that the resistance Rb of the MR element 2 can remain unchanged.

On the other hand, as the signal field Hs acting on the MR element 2 decreases, the resistance of the MR element 2 is inclined to increase from Rb, followed by an increase in the voltage at the positive input terminal of the amplifier OP and a consequent increase in the amplifier output voltage Vo. Consequently, the current flowing through the conductor 4 is increased to increase the bias field Hb. Thus, in the resultant magnetic field acting on the MR element 2, the bias field Hb increases by an amount by which the signal field Hs decreases to make constant the total magnetic field intensity (Hs+Hb) acting on the MR element 2, preventing the resistance of the MR element 2 from changing from Rb.

As is clear from the foregoing, the MR element 2 is applied with the bias field so that its resistance may always take a preset value without changing from, for example, Rb but the output voltage of the amplifier OP, on the other hand, changes to reflect the signal field Hs and therefore the intensity of the signal field Hs can be detected from the output voltage Vo of the amplifier OP.

Even when the signal field Hs changes with time as shown in FIG. 2, the signal field Hs can be detected for the same reasons as described above.

Figure 2B:
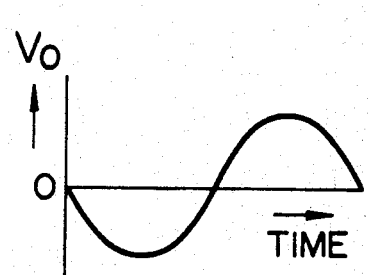

More particularly, when the signal field has changes sinusoidally, the compensation circuit CC operates in such a way that a compensation field Hb having opposite phase to that of the signal field Hs is generated in the conductor 4. Accordingly, in spite of the fact that the resistance of the MR element 2 is maintained at the constant value Rb, the output voltage Vo of the amplifier OP changes as indicated in FIG. 2B correspondingly to the change of Hs. Therefore, by detecting this output voltage, the signal field Hs can be detected with high accuracy.

In this case, the total field intensity applied to the MR element 2 also equals (signal field Hs +compensation field Hb)=constant field Hbo.

As described above, according to the invention, regardless of the fact that the signal field Hs is constant or changes with time, the signal field Hs can be detected in the same manner by detecting the compensation voltage (output voltage Vo of amplifier OP).

The operating point P1 shown in FIG. 2 can be changed by adjusting the voltage of the variable power supply VR shown in FIG. 1. With the voltage increased, the operating point is raised and with the voltage decreased, the operating point is lowered. If the resistor R4 is a variable resistor, the operating point can be changed by adjusting the variable resistor R4 instead of adjustment of the variable power supply $V_R$. In an alternative, the operating point can be changed by changing resistances of the resistors R1 and R2.

Figure 3:
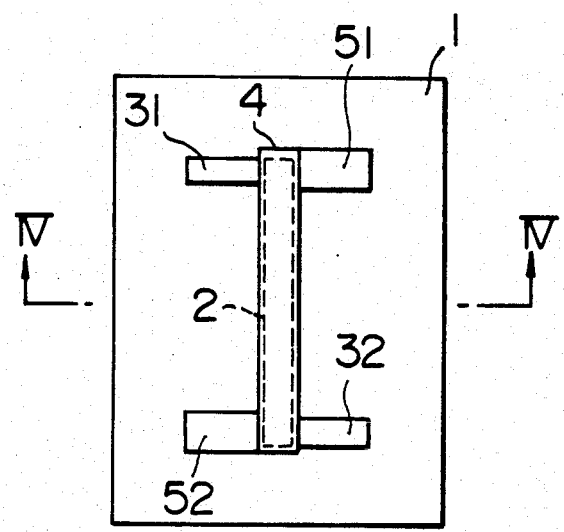
FIG. 3 is a plan view of a magnetic detection apparatus.
Figure 4:
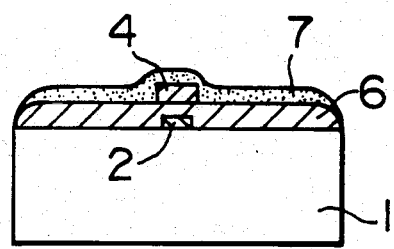
FIG. 4 is a sectional view taken along the line IV—IV in FIG. 3.

The positional relationship between MR element 2 and conductor 4 and a method of manufacturing these components will now be described. FIG. 3 is a plan view and FIG. 4 is a sectional view taken on the line IV—IV of FIG. 3. In these figures, a conductor 4 having a thickness of 0.1–1 $\mu\mu$m and a width of 5–100 $\mu$m, for example, is disposed above an MR element 2 having a thickness of 0.05–0.1 $\mu$m and a width of 10–50 $\mu$m, for example, in register therewith. Referring to FIG. 4, the MR element 2 in the form of a thin film made of, for example, NiFe is formed on the surface of an insulating substrate 1 through vapor deposition, sputtering or etching process. Upon formation of the MR element 2, terminals 31 and 32 may be formed integrally therewith through pattern formation or they may be made of a different material of electrically high conductivity (such as copper or aluminum). Top surfaces of the MR element 2 and terminals 31 and 32 are covered with an insulating coating 6 having a thickness of 1–10 $\mu$m, for example, and made of, for example, $SiO_2$ to prevent exposure of these parts. Further, the conductor 4 serving as the compensation element is bonded to the top surface of the insulating coating 6 and an insulating coating 7 is further applied, thus constituting a structure of MR element 2 and conductor 4.

Figure 6:
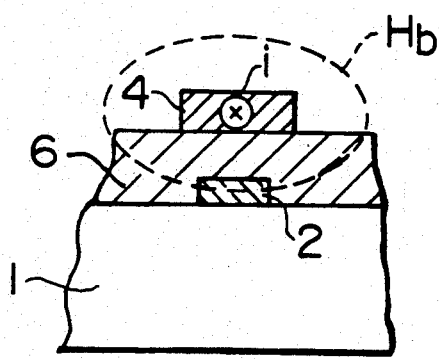
FIG. 6 is a diagram useful to explain the generation of a bias field.

FIG. 6 illustrates how current flowing through the conductor 4 generates the bias field acting on the MR element 2. When current i flows through the conductor 4 in a manner as shown, it generates a bias field Hb in the magnetosensitive direction of the MR element 2. Since the MR element 2 lies within the range of the bias field Hs, the intensity of bias field to be applied to the MR element can be changed freely by adjusting the magnitude of the current flowing through the conductor 4.

Figure 7:
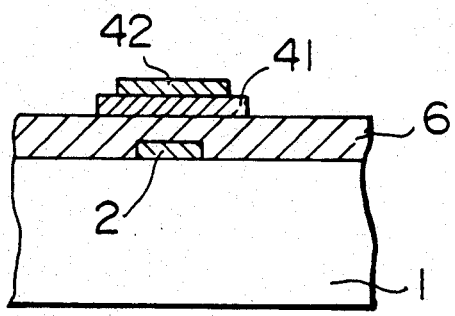
FIGS. 7, 8A, 8B, 9, 10, 11 and 12 are diagrams showing and explaining various examples of the relation between the sensitive element and the compensation element.

FIG. 7 illustrates an example wherein a first conductor 41 made of chromium (Cr) and having capability of highly tight contact to an insulating coating 6 is disposed thereon and a second conductor 42 made of aluminum (Al) and having high electrical conductivity is carried on the first conductor 41.

Figure 8A:
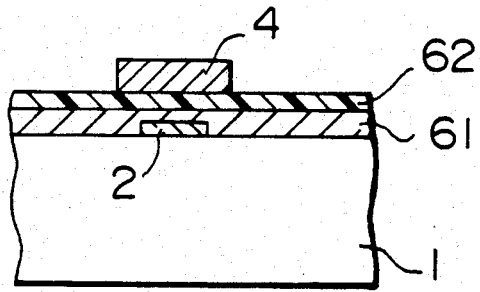

In an example shown in FIG. 8A, the insulator 6 of the foregoing examples is made to be of two layers of which a first-layer insulator 61 is made of silicon oxide ($SiO_2$) and a second-layer insulator 62 formed on the first-layer insulator 61 is made of a polyimide system (PIQ) material and adapted to cover pin-holes in the insulator 61 and to improve fitness preciseness. While the first-layer insulator 61 has a rough surface, the second-layer insulator 62 has a smooth surface; and the materials of the two insulators have good intimacy to each other and are immune from peel-off, offering high reliability.

Figure 8B:
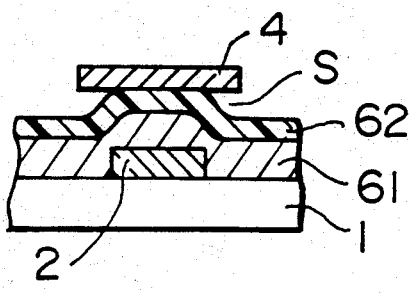

The conductor 4 set forth so far has a width larger than that of the MR element 2 in order to decrease current density. Since the insulating coating covering the MR element 2 is slightly raised above the side edges of the MR element 2 as shown in FIG. 8B, small gaps S ar defined by the stepped portions between the conductor 4 and the insulating coating and moisture stagnates in the gaps S, giving rise to electrolytic corrosion and exfoliation.

Figure 9:
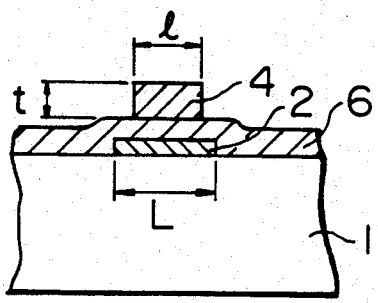

FIG. 9 shows a countermeasure against this problem wherein elimination of the gaps S is realized even in the presence of stepped portions of an insulating coating 6 by making a width l of a conductor 4 smaller than a width L of an MR element 2. With the width of the conductor 4 decreased, the current density increases, leading to adverse heat generation and disconnection and therefore in the example illustrated the conductor 4 has a thickness t increased correspondingly.

Figure 10:
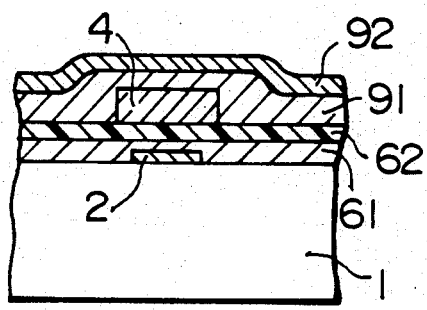

In an example shown in FIG. 10, four protective layers ar provided to improve reliability of protection. An MR element 2 of NiFe is first carried on a substrate 1 and the MR element 2 is covered with a first protective film 61 of $SiO_2$ and a second protective film 62 of polyimide system (PIQ). Further, a conductor 4 is carried on the top surface of the protective film 62 and two layers of protective film 91 of $SiO_2$ and protective film 92 of polyimide system are overlaid sequentially on the conductor 4. In this manner, the conductor 4 and MR element 2 can be protected sufficiently from external shocks and chemical corrosion and the usable environment will not be limited, to advantage.

Figure 11:
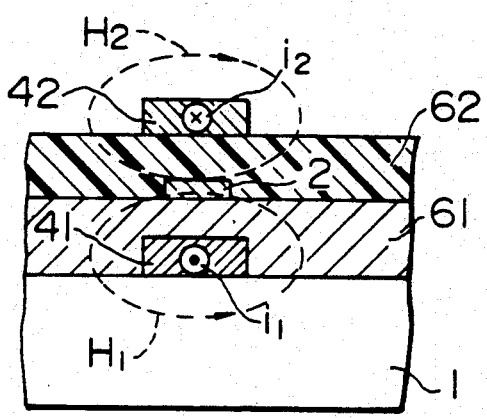

FIG. 11 shows an example wherein two conductors are used to generate bias fields. More particularly, a first conductor 41 is disposed on the surface of a substrate 1, a first protective film 61 is disposed on the first conductor 41 and an MR element 2 is carried on the first protective film 61. The MR element 2 is covered with a second protective film 62 and a second conductor 42 is carried on the top surface of the second protective film 62. Currents i1 and i2 are supplied in directions opposite to each other through the first and second conductors 41 and 42, respectively, to generate bias fields in directions as shown by arrows so that the bias fields additively act on the MR element 2. The resulting bias field has the intensity which is twice the intensity of bias field generated by a single conductor, thereby making it possible to detect highly intensive magnetic fields. For detection of weak magnetic fields, only one of the conductors may be used to apply a corresponding bias field. If in the illustration of FIG. 11 one of the directions of the currents passed through the two conductors is reversed, then bias fields generated thereby will be cancelled out to theoretically establish the absence of bias field provided that the currents flowing through the two conductors has the same magnitude. By utilizing this principle, the magnitudes and directions of the currents can be used in various combinations in accordance with natures of magnetic fields to be detected.

Figure 12:
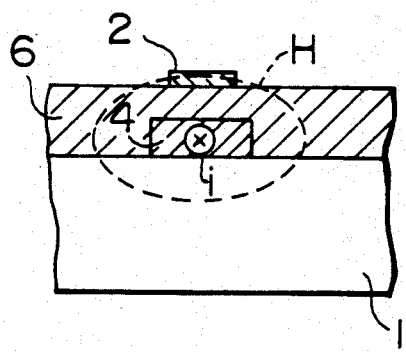

Referring to FIG. 12, there is illustrated an example wherein a conductor 4 is carried on the surface of a substrate 1 and covered with a protective film 6, and an MR element 2 is disposed on the surface of the protective film 6. Because of the disposition of the MR element 2 on the surface closest to the signal field, this construction is suitable for detection of weak magnetic fields.

In the example shown in FIG. 5, the previously-described magnetic detection apparatus with compensation circuit CC is employed for a magnetic encoder adapted to detect rotation angle rotation position or rotation speed.

Figure 13:
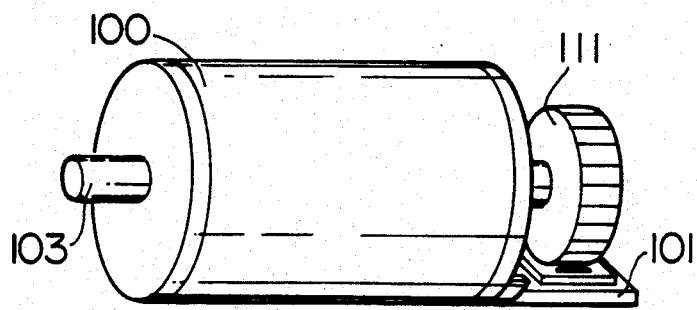
FIG. 13 is a perspective view of a servomotor to which the invention is applied.

Practically, the magnetic encoder is frequently applied to a servomotor as shown in FIG. 13. Referring to FIG. 13, reference numeral 100 designates a motor body, and 101 a support base provided at one end of the motor body 1 and on which a magnetic detection apparatus is disposed A rotary shaft 103 of the motor is mounted, at its tip end, with a non-magnetic rotor 111 having a magnetic recording medium magnetized with a number of magnetic poles. It is desirable that the servomotor be controlled in speed and besides its rotation direction be detected to also control the servomotor in rotation direction on the basis of the detection results.

Figure 14A:
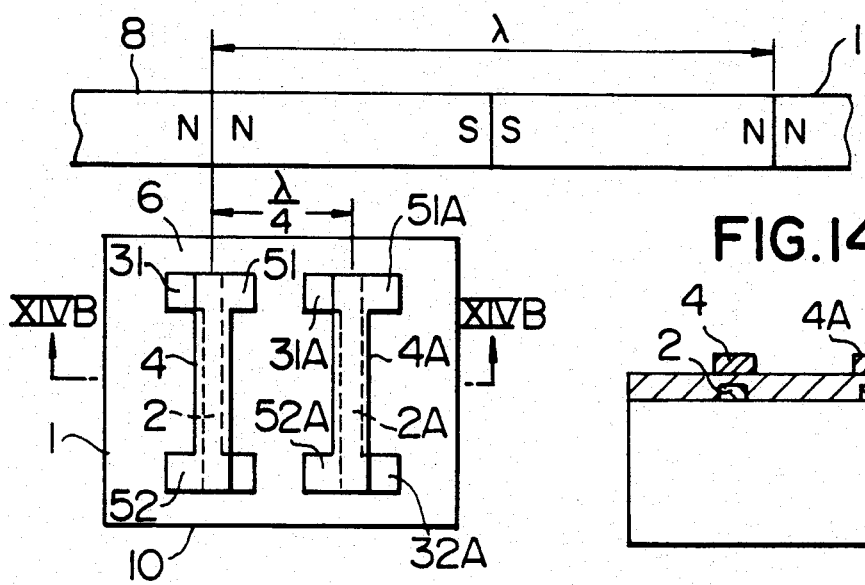
FIGS. 14A, 14B, 14C, 14D and 14E show and explain the concept, compensation circuits and waveforms of a magnetic detection apparatus adapted to detect a two-phase signal by which forward and backward directions can be detected.
Figure 14B:
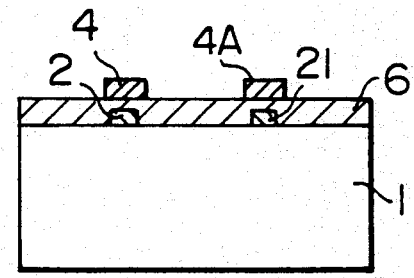

FIGS. 14A to 14E show the construction, electrical connection diagram and signal waveform diagram in connection with a magnetic detection apparatus of the invention capable of detecting the rotation direction. FIG. 14A particularly shows the relation between magnetic signals magnetized on a magnetic recording medium 110 and a magnetic detection apparatus. MR elements 2 and 2A are spaced apart from each other by $\lambda/4$ where $\lambda$ is magnetization pitch (magnetic signal length). Connected to the opposite ends of the MR element 2 are terminals 31 and 32. Similarly connected to the opposite ends of the MR element 2A are terminals 31A and 32A. As in the foregoing embodiments, conductors 4 and 4A are provided to apply bias fields to the MR elements 2 and 2A, respectively, of which opposite ends are connected with terminals 51, 52 and 51A, 52A. Denoted by 1 is a substrate. FIG. 14B is a sectional view taken along the line XIVB—XIVB of FIG. 14A, showing a structure essentially similar to that shown in FIG. 4. Denoted by 6 is a protective film.

Figure 14C:
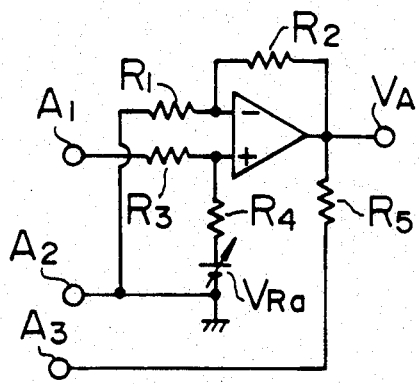
Figure 14D:
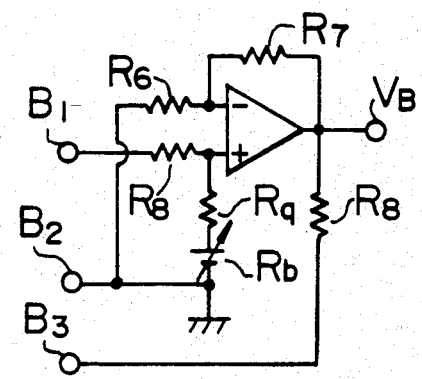
Figure 14E:
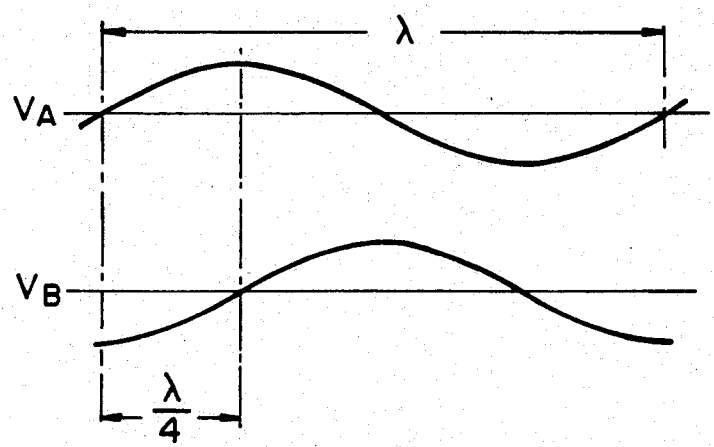

The magnetic detection apparatus is electrically connected as shown in FIGS. 14C and 14D to produce signals as shown in FIG. 14E. Illustrated in FIG. 14C or 14D is the same compensation circuit as that shown in FIG. 1. More specifically, in FIG. 14C, a terminal A1 is connected to the terminal 31 of the MR element 2, a terminal A2 is connected to the terminal 32 of MR element 2 and the terminal 51 of conductor 4, and a terminal A3 is connected to the terminal 52 of conductor 4. Similarly, in FIG. 14D, a terminal B1 is connected the terminal 31A of MR element 2A, a terminal B2 is connected to the terminal 32A of MR element 2A and terminal 51A of conductor 4A and terminal B3 is connected to terminal 52A of the conductor 4A. Denoted by $V_A$ is an output terminal of the compensation circuit of FIG. 14C and by $V_B$ is an output terminal of the compensation circuit of FIG. 14D. As described in relation to FIG. 1, signals serving as compensation currents are delivered from the respective output terminals $V_A$ and $V_B$ to the conductors 4 and 4A. The output signals are sinusoidal as illustrated in FIG. 14E, having a mutual phase difference which is $\lambda/4$ (90 degrees) in terms of electrical angle. This will be understood easily from the fact that the MR elements 4 and 4A shown in FIG. 14A are spaced apart from each other by $\lambda/4$. By detecting the leading or lagging in phase by means of a flip-flop or the like circuit not shown, the rotation direction of the rotor (motor) can be found and the motor can be rotated in any of the forward and backward directions.

Figure 15:
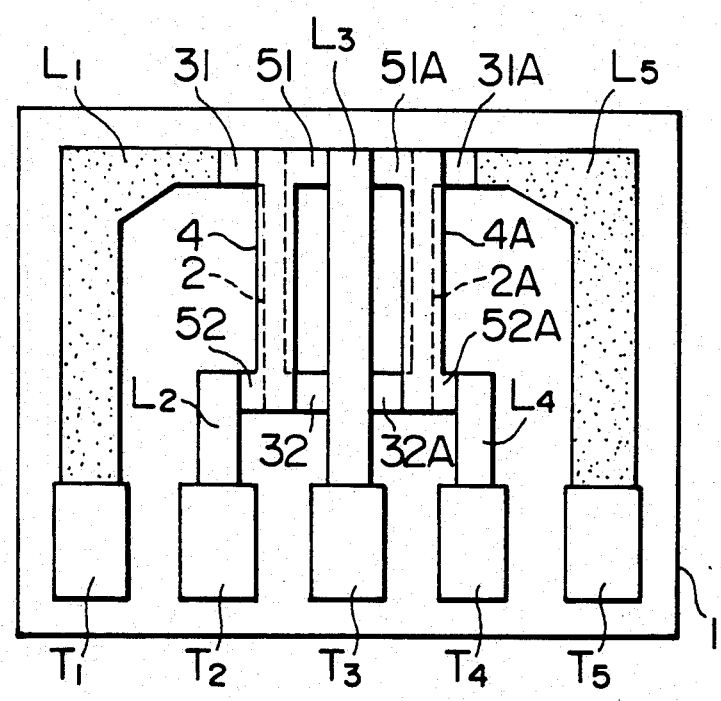
FIG. 15 is a plan view of a sensor of a practical magnetic detection apparatus.

FIG. 15 is a plan view of a magnetic detection apparatus put into practice. Referring to FIG. 15 connection terminals T1 to T5 to external lead wires are located concentrically on one side. An MR element 2 similar to that shown in FIG. 14A has terminals 31 and 32 and a conductor 4 has terminals 51 and 52. An MR element 2A has terminals 31A and 32A and a conductor 4A has terminals 51A and 52A. In comparison with the MR element 2A and conductor 4A of FIG. 14A, the MR element 2A and conductor 4A of FIG. 15 have the corresponding terminals directed oppositely. A lead L1 interconnects the terminal 31 and the connection terminal T1, and lead L2 interconnects the terminal 52 and the connection terminal T2, a lead L3 interconnects the terminals 51, 51A, 32 and 32A and the connection terminal T3, a lead L4 interconnects the terminal 52A and the connection terminal T4, and a lead L5 interconnects the terminal 31A and the connection terminal T5. The leads L1 to L5 may be made of the same material as that of the MR element and the connection terminals T1 to T5 may be made of the same material as that of the conductor, provided that parts to be made of the same magnetic material as that of the MR element 2 or 2A, for example, the leads L1, L5 and L3 are designed to have a sufficiently large width so as not to sense the signal field. Specifically, the width in question may preferably be several of tens times the width of the MR element serving as the magnetosensitive portion. Even at the minimum, the width of interest is required to exceed the magnetic recording pitch λ in order to prevent the leads from being so affected by the magnetic field as to change their resistance. This is because if the leads and terminals, other than the MR element, sense the signal field and other external disturbing magnetism, accurate detection of the signal field can not be ensured.

The magnetic detection apparatus shown in FIG. 15 has the connection terminals T1 to T5 located concentrically on one side thereby making it very easy to perform the connection to the external circuits, for example, a control circuit of the motor and consequently improving the efficiency of connection working. Furthermore, pull-about of the connection wiring is unneeded with the result that the chance of picking up noise can be decreased and advantageously erroneous operation can be prevented.

Figure 16:
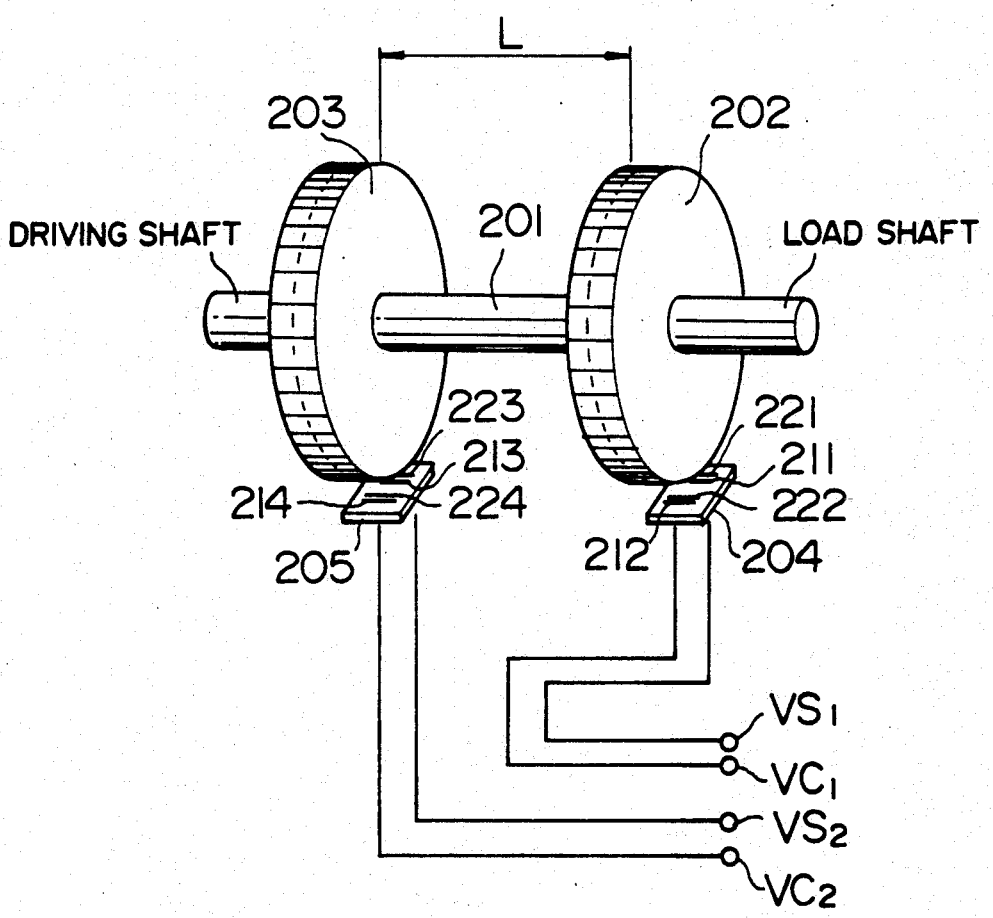
FIG. 16 is a perspective view useful to explain the concept of a torque sensor.

FIG. 16 shows an example where the magnetic detection apparatus explained in relation to FIGS. 14A to 14E is applied to a torque detection apparatus. Referring to FIG. 16, a torsion bar 201 carries, at positions spaced apart from each other by a predetermined distance L, rotary members 202 and 203 each having outer periphery recorded with magnetic signals, and magnetic detect apparatuses 204 and 205 of the type mentioned above are, disposed in close proximity of the outer peripheries of the rotary members 202 and 203. In the magnetic detection apparatus 204, MR elements 211 and 212 are provided in λ/4 spaced relationship and conductors 221 and 222 for application of bias fields are disposed in close proximity of the MR elements. The magnetic detection apparatus 205 is also provided with MR elements 213 and 214 and conductors 223 and 224 which are disposed in the same positional relationship as above. The rotary members 202 and 203 are located at an identical angular position, the MR elements 211 and 223 are located at an identical angular position, and the MR elements 212 and 214 are located at an identical angular position.

As the torsion bar 201 rotates under the application of torsional force, the rotary members 202 and 203 are rotated concomitantly. Responsive to the rotations of the rotary members 202 and 203, the magnetic detection apparatus 204 produces sinusoidal output signals Vs1 and Vc1 which are 90° (λ/4) out of phase from each other and the magnetic detection apparatus 205 produces sinusoidal output signals Vs2 and Vc2 also 90° dephased mutually. Thus, the output signals Vs1 and Vc1 or the output signals Vs2 and Vc2 take signal waveforms as shown in FIG. 14E. Given that the Vs1 and Vs2 are sine waves, the Vc1 and Vc2 are cosine waves and these waves are generally termed sinusoidal waveforms. The magnetic detection apparatuses 204 and 205 are disposed such that in the absence of torque applied to the torsion bar 201, Vs1 and Vc2 are exactly in phase and Vc1 and Vc2 are also exactly in phase, substantially with no phase difference therebetween, respectively. On the other hand, when torque is applied to the torsion bar 201 to cause torsion in the torsion bar 201, a phase difference develops between the Vs1 and Vs2 or the Vc1 and Vc2. By detecting this phase difference, a torsional angle can be determined. Since the angle of torsion is proportional to the torque as well known in the art, torque exerting the torsion bar can be detected from an angle of torsion, that is, a phase difference. The phase difference between Vs1 and Vs2 equals that between Vc1 and Vc2 and therefore any of the former and latter phase differences can be used.

Even when the thus rotated rotary members are brought into equilibrium with the applied torque to stop rotating, the MR elements continue to detect the magnetic fields, thereby permitting continuous detection of the torque even when the torsion bar stops rotating. In addition, since the rotary member does not contact the MR element, no wear occurs and the expected performance can be maintained for many years.

This torque detection apparatus features detecting torque from the phase difference between sinusoidal waves, especially, capability of detecting torque from an angle within one cycle in analog fashion. In an arrangement where this sinusoidal wave is shaped into a pulse, an angle within the duration of the pulse, that is, an angle of torsion within one pitch of the magnetic signal can not be detected theoretically. In accordance with the technique of the invention, however, an accurate sinusoidal signal can be obtained and therefore as fine an angle or torque as possible can be detected accurately. Experiments demonstrated that a fraction of 1/128 to 1/256 of one cycle could be detected.

Figure 17:
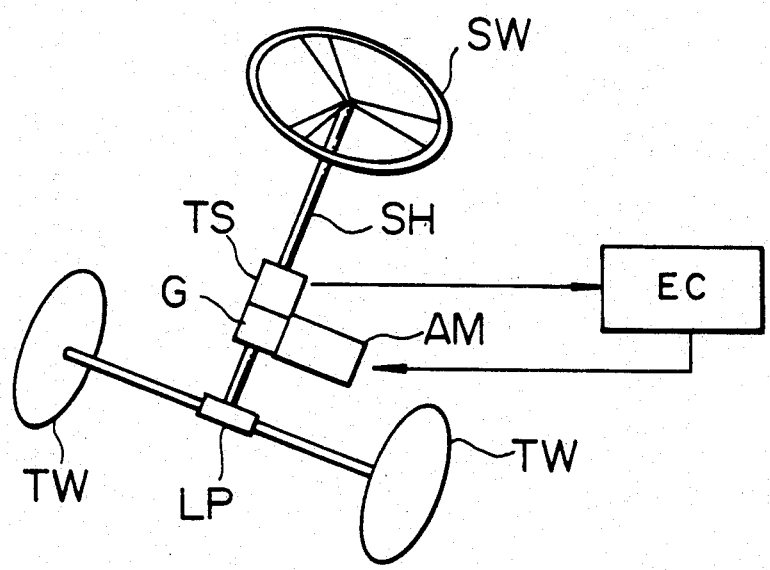
FIG. 17 is a schematic diagram useful to explain the concept of a power steering apparatus.

FIG. 17 illustrates an example where this torque sensor is applied to a power steering apparatus of automobiles. Referring to FIG. 17, reference character SW designates a steering wheel and SH a steering shaft on which a torque sensor TS of the type shown in FIG. 15 and a reduction gear G are mounted. Denoted by AM is an assist motor, LP rack and pinion, TW wheels and EC an electronic controller.

As the steering wheel SW is rotated, the torsion bar of the torque sensor TS is twisted. A resulting torsional angle is detected by the torque sensor TS, the electronic control circuit EC calculates an assist force complying with the torsional angle and the calculated assist force is applied to the shaft SH. Practically, the electronic control circuit is so operated that an assist force for keeping the torsional angle of the torsion bar constant can be generated in the motor AM.

The power steering apparatus is carried on automobiles in which conditions of vibration and moisture and thermal conditions are bad, but the torque detection apparatus of the present invention is of the contactless type and continues to detect torque with high fidelity even during stopping, thus ensuring high reliability and safety. Accordingly, the invention can be applied suitably to automobiles.

Figure 18:
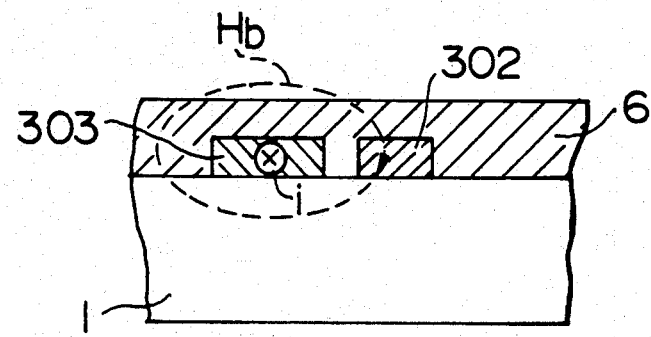
FIGS. 18 and 19 are diagrams showing examples of the relation between the sensitive element and the compensation element when the sensitive element is made of indium antimony.

FIG. 18 shows an example where the magnetosensitive element is made of indium antimony (InSb) and the bias field is applied thereto. Referring to FIG. 18, a magnetosensitive element 302 made of indium antimony is disposed on an insulating substrate 1 and a conductor 303 is juxtaposed laterally of the magnetosensitive element. When a current i is passed through the conductor 303, a bias field Hb is generated which acts on the magnetosensitive element 302. Since the magnetosensitive element 303 of indium antimony senses a vertical magnetic field, the magnetic field generated by the current i acts as a bias field. Reference numeral 6 designates an insulator.

Figure 19:
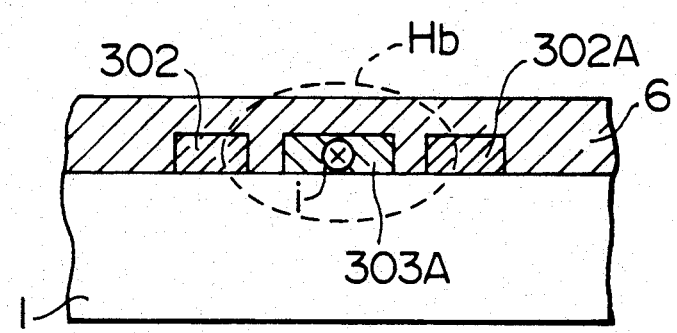

FIG. 19 shows an example where a bias field is applied to two magnetosensitive elements 302 and 302A by means of a single conductor 303A. The magnetosensitive elements 302 and 302A are disposed on both sides of the conductor 303A and with a current i passed through the conductor 303A, a field Hb is generated which acts on the magnetosensitive elements 302 and 302A simultaneously.

Figure 20:
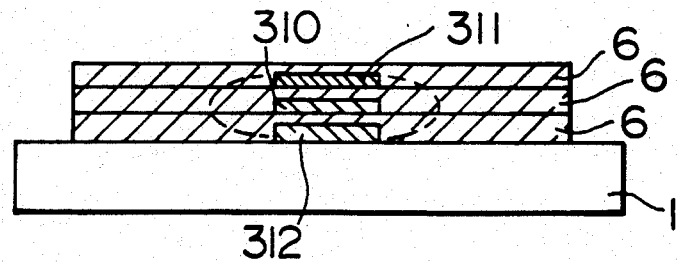
FIG. 20 is a diagram showing a further example of the relation between the sensitive element and the compensation element.
Figure 21:
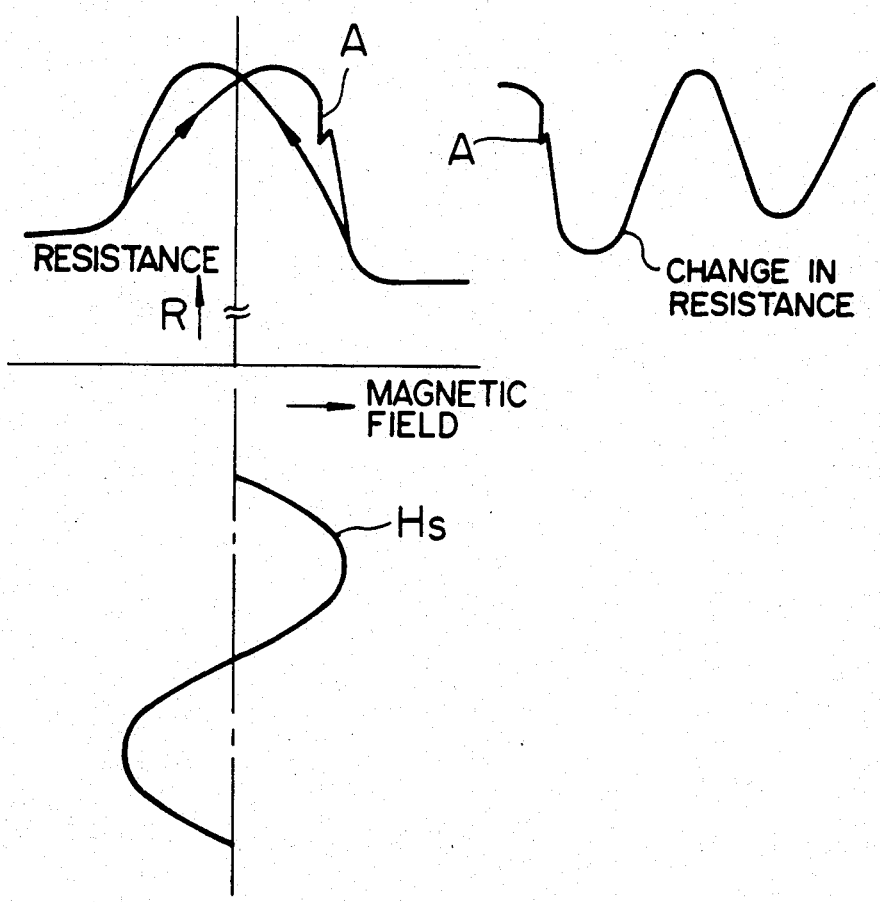
FIG. 21 is a diagram showing signal waveforms appearing in the prior art apparatus.

FIG. 20 shows another similar example where the bias field is applied to two magnetosensitive elements by using a single conductor. Referring to FIG. 20, MR elements 311 and 312 are disposed vertically of a conductor 310.

In the figure, reference numeral 1 designates a substrate and 6 protective films.

In the examples of FIGS. 19 and 20, a plurality of magnetosensitive elements are applied with the bias field by means of a single conductor, attaining reduction in the number of parts to advantage but there arises a problem that the signal field can not be sensed equally by the respective magnetosensitive elements, leaving behind a task to be solved in the future.

The foregoing embodiment has been described as applied to measurement of physical quantities especially magnetic quantities but may be applied similarly to measurement of temperatures.

In such an application, the MR element shown in FIG. 1 and FIGS. 14A to 14E is replaced by a thermistor which changes its resistance by sensing temperatures, and the conductor for application of the bias field is replaced by a compensation thermistor for application of a bias temperature, and current is passed through the compensation thermistor so as to detect ambient temperatures. The temperature sensitive thermistor also has a hysteresis and therefore a compensation temperature is so applied as to keep the resistance of the thermistor constant and the compensation temperature is detected, thereby preventing the occurrence of hysteresis to ensure accurate detection of ambient temperatures.

Various kinds of physical quantities representative of light, pressure and the like can be detected in a similar manner by providing a sensitive element and a compensation element acting on the sensitive element and detecting a value of current so passed through the compensation element as to keep the resistance of the sensitive element constant.

As described above, in accordance with the invention, the resistance of the sensitive element is not detected directly but a current passed through or a voltage applied to the compensation element operable to keep the resistance of the sensitive element constant is detected, in order to detect a physical quantity and consequently a detection value of the physical quantity can perfectly be devoid of hysteresis to ensure accurate detection of the physical quantity.

In addition, no Barkhausen noise takes place in the detection signal waveform and if so desired, an analog value of the signal waveform can be used, as it is, for position detection and angle detection of high accuracy and high resolution.

By virtue of the generation of accurate analog value, the present invention is suitable for torque sensors.

Furthermore, thanks to the contactless detection of torque which does not impair reliability even under the bad conditions of vibration and environment, the present invention can advantageously be applied to power steering apparatus of cars.

We claim:

1. A method of detecting an intensity of an external magnetic field by utilizing a magnetoresistive element whose resistance changes with variation of the intensity of the external magnetic field, the method comprising the steps of:

applying a constant current to the magnetoresistive element;

disposing a compensation element which produces a magnetic field when electrically energized so that the magnetic field produced by the compensation element is applied to the magnetoresistive element;

controlling the electrical energization of the compensation element so that the variation in intensity of the external magnetic field applied to the magnetoresistive element is substantially cancelled by variation in intensity of the magnetic field produced by the compensation element and applied to the magnetoresistive element; and determining a variation of the intensity of the external magnetic field in accordance with the controlled electrical energization of the compensation element.

2. A method according to claim 1, wherein the step of disposing includes disposing the compensation element proximate to the magnetoresistive element.

3. A method according to claim 2, wherein the step of disposing includes disposing the compensation element at at least one of above and below the magnetoresistive element.

4. A method according to claim 3, wherein the compensation element is disposed above the magnetoresistive element.

5. A method according to claim 1, wherein the magnetoresistive element having the constant current applied thereto has constant current flowing therethrough, the magnetoresistive element being spaced from a member for generating the external magnetic field to be detected.

6. An apparatus for detecting an intensity of an external magnetic field comprising:

a magnetoresistive element disposed so that an internal resistance thereof changes with variation of the external magnetic field;

a constant current source for applying a constant current to the magnetoresistive element;

a compensation element for producing a magnetic field when electrically energized, the compensation element being disposed so that the magnetic field produced by the compensation element is applied to the magnetoresistive element;

means for controlling the electrical energization of the compensation element so that the variation in intensity of the external magnetic field applied to the magnetoresistive element is substantially cancelled by variation in intensity of the magnetic field produced by the compensation element and applied to the magnetoresistive element; and means for determining the variation of the intensity of the external magnetic field in accordance with the controlled electrical energization of the compensation element.

7. An apparatus according to claim 6, wherein the magnetoresistive element having the constant current applied thereto has constant current flowing therethrough, the magnetoresistive element being spaced from a member for generating the external magnetic field to be detected.

8. A servomotor system comprising a servomotor, means for converting a rotation of the servomotor into a variation of a magnetic field, and means for detecting the rotation of the servomotor by detecting the variation of the magnetic field, the means for detecting the variation of the magnetic field including:

a magnetoresistive element disposed so that an internal resistance thereof changes with the variation of the magnetic field;

a constant current source for applying a constant current to the magnetoresistive element;

a compensation element for producing another magnetic field when electrically energized, the compensation element being disposed so that the another magnetic field produced by the compensation element is applied to the magnetoresistive element;

means for controlling the electrical energization of the compensation element so that the variation in intensity of the magnetic field applied to the magnetoresistive element is substantially cancelled by variation in intensity of the another magnetic field produced by the compensation element and applied to the magnetoresistive element; and means for determining the variation of the intensity of the magnetic field in accordance with the controlled electrical energization of the compensation element.

9. A servomotor system according to claim 8, wherein the magnetoresistive element having the constant current applied thereto has constant current flowing therethrough, the magnetoresistive element being spaced from a movable member of the servomotor.

10. A power steering apparatus comprising a torque sensor for sensing a torque applied to a power steering shaft, the torque sensor including means for converting the torque applied to the steering shaft to an angular twist of the steering shaft, means for converting the angular twist of the steering shaft into a variation of a magnetic field, and means for detecting the variation of the magnetic field, the means for detecting the variation of the magnetic field including:

a magnetoresistive element disposed so that an internal resistance thereof changes with the variation of the magnetic field;

a constant current source for applying a constant current t the magnetoresistive element;

a compensation element for producing another magnetic field when electrically energized, the compensation element being disposed so that the another magnetic field produced by the compensation element is applied to the magnetoresistive element;

means for controlling the electrical energization of the compensation element so that the variation in intensity of the magnetic field applied to the magnetoresistive element is substantially cancelled by a variation in intensity of the another magnetic field produced by the compensation element and applied to the magnetoresistive element; and means for determining the variation of the intensity of the magnetic field in accordance with the controlled electrical energization of the compensation element.

11. A power steering apparatus according to claim 10, wherein the magnetoresistive element having the constant current applied thereto has constant current flowing therethrough, the magnetoresistive element being spaced from a movable member of the power steering apparatus.

12. An apparatus for detecting an intensity of a magnetic field comprising:

a magnetoresistive element disposed so that an internal resistance thereof changes with a variation of the magnetic field;

a constant current source for applying a constant current to the magnetoresistive element;

means energized by electrical power for producing a bias magnetic field which is applied to the magnetoresistive element, the bias magnetic field producing means including a compensation circuit for controlling the electrical power thereby controlling the bias magnetic field so as to enable cancellation of the variation in intensity of the magnetic field applied to the magnetoresistive element; and means for determining the intensity of the magnetic field in accordance with the electrical power controlled by the compensation circuit.

13. An apparatus according to claim 12, wherein the magnetoresistive element having the constant current applied thereto has constant current flowing therethrough, the magnetoresistive element being spaced from a member for generating a magnetic field to be determined.

14. An apparatus for detecting a torque applied to a torsion bar comprising:

a pair of rotating members mounted on opposite ends of the torsion bar, each of the rotating members being magnetized at a polarity which is alternately reversed in a direction of rotation thereof;

means for detecting a magnetic field produced by each of the magnetized rotating members during rotation of the torsion bar, the detecting means including:

a magnetoresistive element disposed adjacent to each of the rotating members;

a constant current source for applying a constant current to the magnetoresistive element;

a compensation element coupled to the respective magnetoresistive element, the compensation element being energized by electrical current for producing a compensation magnetic field which is applied to the associated coupled magnetoresistive element; and means for controlling the electrical current energizing the compensation element so that a magnetic field applied to the associated coupled magnetoresistive element; and means for controlling the electrical current energizing the compensation element so that a magnetic field applied to the associated coupled magnetoresistive element due to the magnetization of the adjacent rotating member is cancelled by the compensation magnetic field produced buy the associated compensation element; and means for determining the torque applied to the torsion bar in accordance with a phase difference between the electrical current controlled by the electrical current controlling means for one of the rotating members and for the other of the rotating members.

15. An apparatus according to claim 14, wherein the magnetoresistive element having the constant current applied thereto has constant current flowing therethrough, the magnetoresistive element being spaced from the rotating member adjacent thereto.

16. An apparatus for detecting a position of a first member relative to a second member, said first member being movable relative to said second member along a predetermined path, said apparatus comprising:

a magnetic medium fixed to said first member, said magnetic medium being magnetized to produce a first magnetic field having an intensity which changes alternately at a predetermined pitch along said predetermined path;

a magnetic sensor fixed to said second member so that said first magnetic field is applied to said magnetic sensor, said magnetic sensor including at least one magnetoresistive element disposed so that an internal resistance thereof changes in intensity of said first magnetic field applied thereto, a constant current source for applying a constant current to said at least one magnetoresistive element, a compensation element for producing a second magnetic field when electrically energized so that said second magnetic field is applied to said at least one magnetoresistive element, and control means for controlling an intensity of the electrical energization of said compensation element so that the change in intensity of the first magnetic field applied to said at least one magnetoresistive element is substantially cancelled by a change in intensity of said second magnetic field, and means for producing an output signal indicative of the change in intensity of said first magnetic field applied to said magnetoresistive element in accordance with the controlled intensity of the electrical energization of said compensation element; and means for determining the position of said first member relative to said second member based on said output signal of said magnetic sensor.

17. An apparatus according to claim 16, wherein said at least one magnetoresistive element having the constant current applied thereto has constant current flowing therethrough, the at least one magnetoresistive element being spaced from said first member.

* * * * *